United States Patent
Lee et al.

(10) Patent No.: US 9,295,088 B2
(45) Date of Patent: Mar. 22, 2016

(54) RRC CONNECTION METHOD AND DEVICE THEREFOR IN WIRELESS COMMUNICATION SYSTEM

(75) Inventors: Youngdae Lee, Anyang-si (KR);
Sunghoon Jung, Anyang-si (KR);
Seungjune Yi, Anyang-si (KR);
Sungduck Chun, Anyang-si (KR);
Sungjun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 214 days.

(21) Appl. No.: 13/883,885

(22) PCT Filed: Nov. 8, 2011

(86) PCT No.: PCT/KR2011/008456
§ 371 (c)(1),
(2), (4) Date: May 7, 2013

(87) PCT Pub. No.: WO2012/064076
PCT Pub. Date: May 18, 2012

(65) Prior Publication Data
US 2013/0237267 A1 Sep. 12, 2013

Related U.S. Application Data

(60) Provisional application No. 61/411,451, filed on Nov. 8, 2010.

(51) Int. Cl.
*H04W 76/02* (2009.01)

(52) U.S. Cl.
CPC .................................... *H04W 76/02* (2013.01)

(58) Field of Classification Search
CPC ....... H04W 76/02; H04W 7/00; H04W 76/00; H04W 76/021; H04W 76/022; H04W 76/023; H04W 76/025; H04W 76/027; H04W 76/028; H04W 76/04; H04W 76/06; H04W 76/041; H04W 76/043; H04W 76/045
USPC ........... 455/509, 456.6, 422.1, 454, 450, 423, 455/522, 452.1; 370/328, 329, 331, 341
See application file for complete search history.

(56) References Cited

U.S. PATENT DOCUMENTS

| | | | |
|---|---|---|---|
| 6,731,944 B1 * | 5/2004 | Ostrup et al. | 455/458 |
| 7,428,756 B2 * | 9/2008 | Wookey | 726/26 |
| 2005/0170842 A1 * | 8/2005 | Chen | 455/454 |
| 2006/0198309 A1 * | 9/2006 | Cortes et al. | 370/241 |
| 2007/0042785 A1 * | 2/2007 | Nakamata | 455/450 |
| 2007/0287476 A1 * | 12/2007 | Jeong et al. | 455/456.6 |

(Continued)

FOREIGN PATENT DOCUMENTS

| | | |
|---|---|---|
| KR | 10-2009-0070487 A | 7/2009 |
| KR | 10-2009-0081728 A | 7/2009 |
| KR | 10-2009-0095060 A | 9/2009 |

*Primary Examiner* — Tan H Trinh
(74) *Attorney, Agent, or Firm* — Birch, Stewart, Kolasch & Birch, LLP

(57) ABSTRACT

The present application relates to a method for a terminal having latency tolerance to perform procedures for connection with a network in a wireless communication system. Specifically, the method is characterized in comprising the steps of: transmitting a connection request message to the network; receiving a connection set message from the network in response to the connection request message; and transmitting a connection set completion message to the network, wherein the connection request message comprises a low priority connection indicator.

13 Claims, 9 Drawing Sheets

(56) References Cited

U.S. PATENT DOCUMENTS

| | | | |
|---|---|---|---|
| 2008/0090560 A1* | 4/2008 | Bouzid et al. | 455/416 |
| 2008/0298325 A1* | 12/2008 | Vujcic | 370/336 |
| 2009/0201864 A1* | 8/2009 | Ahluwalia | 370/329 |
| 2009/0238143 A1* | 9/2009 | Mukherjee et al. | 370/331 |
| 2009/0316637 A1* | 12/2009 | Yi et al. | 370/329 |
| 2010/0041412 A1* | 2/2010 | Yu | 455/450 |
| 2010/0210297 A1* | 8/2010 | Simonsson et al. | 455/522 |
| 2010/0322188 A1* | 12/2010 | Nagatake et al. | 370/331 |
| 2011/0032889 A1 | 2/2011 | Lee et al. | |
| 2011/0032898 A1* | 2/2011 | Kazmi et al. | 370/329 |
| 2011/0086665 A1* | 4/2011 | Nakamura | 455/522 |
| 2011/0110302 A1* | 5/2011 | Faurie et al. | 370/328 |
| 2011/0151885 A1* | 6/2011 | Buyukkoc et al. | 455/452.1 |
| 2011/0201344 A1* | 8/2011 | Ryu et al. | 455/450 |
| 2011/0235575 A1* | 9/2011 | Tapia et al. | 370/328 |
| 2011/0268026 A1* | 11/2011 | Ronneke et al. | 370/328 |
| 2011/0274058 A1* | 11/2011 | Diachina et al. | 370/329 |
| 2012/0063305 A1* | 3/2012 | Chiu et al. | 370/230 |
| 2012/0083262 A1* | 4/2012 | Dimou et al. | 455/423 |
| 2013/0040597 A1* | 2/2013 | Jang | H04W 48/02 455/404.1 |
| 2014/0029594 A1* | 1/2014 | Lee | H04W 72/0446 370/336 |

* cited by examiner (a) Control-Plane Protocol Stack (b) User-Plane Protocol Stack

RRC CONNECTION METHOD AND DEVICE THEREFOR IN WIRELESS COMMUNICATION SYSTEM

CROSS REFERENCE TO RELATED APPLICATIONS

This application is the National Phase of PCT/KR2011/008456 filed on Nov. 8, 2011, which claims priority under 35 U.S.C. §119(e) to U.S. Provisional Application Nos. 61/411,451 filed on Nov. 8, 2010, all of which are hereby expressly incorporated by reference into the present application.

FIELD OF THE INVENTION

The present invention relates to a wireless communication system and, more particularly, to an RRC (Radio Resource Control) method and device therefor in a wireless communication system.

BACKGROUND ART

As an example of a wireless communication system to which the present invention may be applied, a 3GPP LTE ($3^{rd}$ Generation Partnership Project Long Term Evolution; hereinafter referred to as "LTE") communication system will now be broadly described.

FIG. 1 illustrates a general view of an E-UMTS network structure as an example of a wireless communication system. Herein, the E-UMTS (Evolved Universal Mobile Telecommunications System) corresponds to a system evolved from the conventional UMTS (Universal Mobile Telecommunications System). The 3GPP is presently carrying out a basic standardization process for the E-UMTS. Generally, the E-UMTS may also be referred to as an LTE system. For details of the technical specifications of the UMTS and the E-UMTS, reference may be made to Release 7 and Release 8 of "3rd Generation Partnership Project; Technical Specification Group Radio Access Network".

Referring to FIG. 1, the E-UMTS includes a User Equipment (UE)(120), base stations (eNode B; eNB) 110a and 110b, and an Access Gateway (AG), which is located at an end of a network (E-UTRAN) and connected to an external network. The base stations can simultaneously transmit multiple data streams for a broadcast service, a multicast service and/or a unicast service.

One or more cells may exist for one base station. One cell is set to one of bandwidths of 1.25, 2.5, 5, 10, and 20 Mhz to provide a downlink or uplink transport service to several user equipments. Different cells may be set to provide different bandwidths. Also, one base station controls data transmission and reception for a plurality of user equipments. The base station transmits Downlink (DL) scheduling information of downlink data to the corresponding user equipment to notify information related to time and frequency domains to which data will be transmitted, encoding, data size, and HARQ (Hybrid Automatic Repeat and reQuest). Also, the base station transmits Uplink (UL) scheduling information of uplink data to the corresponding user equipment to notify information related to time and frequency domains that can be used by the corresponding user equipment, encoding, data size, and HARQ. An interface for transmitting user traffic or control traffic can be used between the base stations. A Core Network (CN) may include the AG and a network node or the like for user registration of the UE. The AG manages mobility of a UE on a TA (Tracking Area) unit basis, wherein one TA unit includes a plurality of cells.

The wireless communication technology has been developed up to the LTE based upon WCDMA. However, the demands and expectations of the users and the manufacturers and providers are growing continuously. Also, since other wireless access technologies are constantly being developed, the wireless communication technology is required to newly evolve in order to ensure competitiveness in the future. Accordingly, characteristics, such as reduced cost for each bit, extended service availability, usage of a flexible frequency band, simple structure and open interface, and adequate power consumption of the user equipment are being requested.

DETAILED DESCRIPTION OF THE INVENTION

Technical Objects

Based upon the discussion made as described above, an RRC (Radio Resource Control) method and device therefor in a wireless communication system will hereinafter be proposed. More specifically, an object of the present invention is to provide a method that can transmit establishment cause information including a low-priority access indicator to a network through an RRC connection request message of a delay tolerant access supported user equipment (or device).

Technical Solutions

A method of a user equipment for performing a connection procedure with a network in a wireless communication system includes transmitting to the network a connection request message for being connected with the network; as a response to the connection request message, receiving a connection establishment message from the network; and transmitting a connection establishment complete message to the network, and, herein, the connection request message may include a low-priority access indicator. Herein, the low-priority access indicator may be set up by an Establishment Cause of the connection request message, and the low-priority access indicator may indicate a Delay Tolerant Access to the network.

Additionally, the method may further include receiving information on a priority level of a connection to the network from a higher layer. The higher layer may correspond to a NAS (Non-Access Stratum) layer. Herein, the information on a priority level of a connection to the network may include information on an Establishment Cause of the connection request message.

Further, the method may further include receiving a connection cancel message from the network, the connection cancel message including a delay tolerant access overload indicator. Additionally, when the user equipment does not access an HPLMN (Home Public Land Mobile Network), the connection request message or the connection establishment complete message may include a roaming user equipment indicator.

Meanwhile, in another aspect of the present invention, a method of a network for performing a connection procedure with a user equipment in a wireless communication system includes receiving a connection request message for being connected with the network from the user equipment; as a response to the connection request message, transmitting a connection establishment message to the user equipment; and receiving a connection establishment complete message from the user equipment, and, herein, the connection request message may include a low-priority access indicator. Herein, the low-priority access indicator may be set up by an Establishment Cause of the connection request message, and the low-priority access indicator may indicate a Delay Tolerant Access to the network.

Meanwhile, the method may further include transmitting a connection cancel message to the user equipment, wherein the connection cancel message includes a delay tolerant access overload indicator. Further, when the user equipment does not access an HPLMN (Home Public Land Mobile Network), the connection request message or the connection establishment complete message may include a roaming user equipment indicator.

Moreover, the connection establishment complete message may include capability information of the user equipment.

Effects of the Invention

According to the exemplary embodiment of the present invention, the wireless communication system may be capable of effectively controlling the connection with an RRC layer of the delay tolerant access supported user equipment (or device).

The effects that may be gained from the embodiment of the present invention will not be limited only to the effects described above. Accordingly, additional effects of the present application will be set forth in part in the description which follows and in part will become apparent to those having ordinary skill in the art upon examination of the following or may be learned from practice of the present application. More specifically, unintended effects obtained upon the practice of the present invention may also be derived by anyone having ordinary skill in the art.

BEST MODE FOR CARRYING OUT THE PRESENT INVENTION

Hereinafter, reference will now be made in detail to the preferred embodiments of the present invention, examples of which are illustrated in the accompanying drawings. The detailed description of the present invention is provided to facilitate the understanding of the configuration, operation, and other characteristics of the present invention. The following embodiments of the present invention correspond to examples wherein the technical features of the present invention are applied in the 3GPP system.

The description of the present invention will be described by using an LTE system and an LTE-A system. However, these are only exemplary, and, therefore, the present invention may also be applied to any communication system corresponding to the definition provided above. Moreover, although the exemplary embodiment of the present invention is described based upon an FDD method, this is merely exemplary. And, therefore, the exemplary embodiment of the present invention may also be easily modified, so as to be applied to n H-FDD method or a TDD method.

Figure 1:
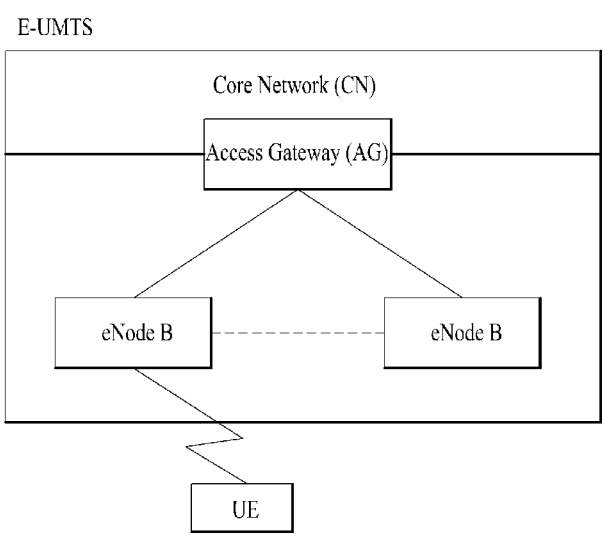
FIG. 1 illustrates a general view of an E-UMTS network structure as an example of a wireless communication system.
Figure 2:
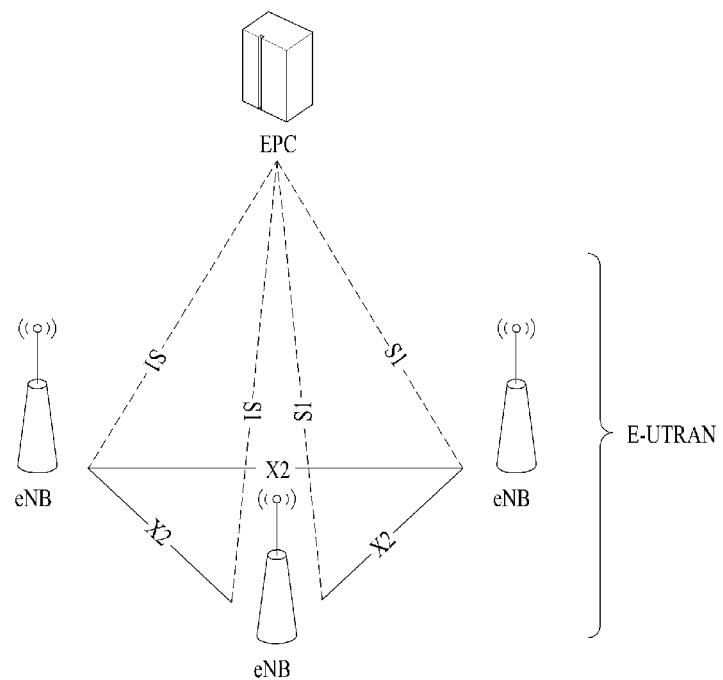
FIG. 2 illustrates an exemplary structure of an E-UTRAN (Evolved Terrestrial Radio Access Network).

FIG. 2 illustrates an exemplary structure of an E-UTRAN (Evolved Terrestrial Radio Access Network). Most particularly, the E-UTRAN system corresponds to an evolved version of the conventional UTRAN system. The E-UTRAN is configured of cells (eNBs), and each cell is connected to one another through an X2 interface and is also connected to an EPC (Evolved Packet Core) through an S1 interface.

The EPC is configured of an MME (Mobility Management Entity), an S-GW (Serving-Gateway), and a PDN-GW (Packet Data Network-Gateway). The MME carries access information of the UE or information on the capability of the UE. Such information is mainly used for managing the mobility of the UE. The S-GW corresponds to a gateway having the E-UTRAN as its end-point, and the PDN-GW corresponds to a gateway having the PDN as its end-point.

Figure 3:
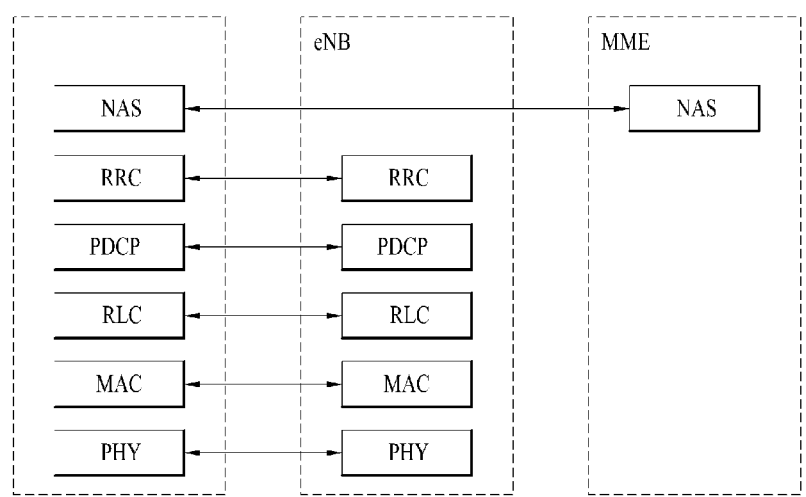
FIG. 3 illustrates a Control Plane structure and a User Plane structure of a Radio Interface Protocol between a user equipment and the E-UTRAN based upon the 3GPP radio access network standard.
Figure 3:
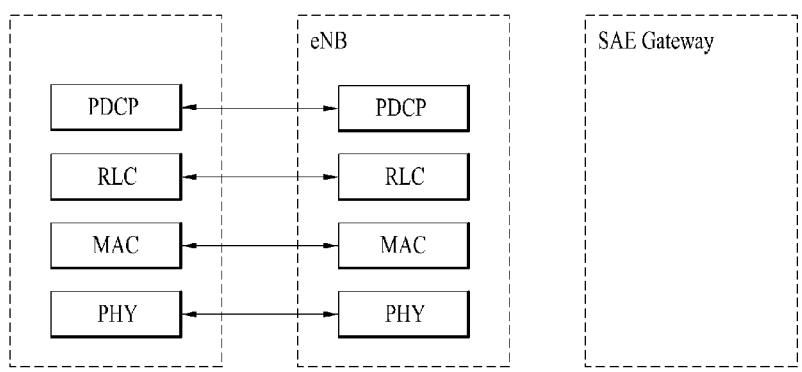

FIG. 3 illustrates a Control Plane structure and a User Plane structure of a Radio Interface Protocol between a user equipment and the E-UTRAN based upon the 3GPP radio access network standard. A control plane refers to a path through which control messages are transmitted. Herein, the control messages are used by the User Equipment (UE) and network in order to manage a unit. And, a user plane refers to a path through which data generated from an application layer are transmitted. Such data may include audio data or Internet packet data, and so on.

A first layer, which corresponds to a physical layer, uses a physical channel to provide an Information Transfer Service to a higher layer. The physical layer is connected to a Medium Access Control layer, which corresponds to a higher layer, through a Transport Channel. And, herein, data is transported between the Medium Access Control layer and the physical layer through the Transport Channel. In a data transmission between a physical layer of the transmitting end and a physical layer of the receiving end, data are transported between the physical layers through a physical channel. Herein, the physical layer uses time and frequency as radio resource. More specifically, in a downlink, the physical channel is modulated by using an OFDMA (Orthogonal Frequency Division Multiple Access) scheme, and, in an uplink, the physical channel is modulated by using an SC-FDMA (Single Carrier Frequency Division Multiple Access) scheme.

A Medium Access Control (MAC) layer of a second layer provides services to a Radio Link Control (RLC) layer, which corresponds to higher layer, through a logical channel. The Radio Link Control (RLC) layer of the second layer supports the transmission of reliable data. The function of the RLC layer may also be realized by a functional block within the MAC. A PDCP (Packet Data Convergence Protocol) layer of the second layer performs a header compression function, which can reduce unnecessary control information in order to efficiently transmit IP packets, such as IPv4 or IPv6, in a wireless (or radio) interface having a narrow bandwidth.

A Radio Resource Control (RRC) layer which is positioned in a lowermost portion of a third layer is defined only in the control plane. And, in relation with the Configuration, Re-configuration, and Release of Radio Bearers (RBs), the RRC layer performs the role of controlling the logical channels, the transmission channels, and the physical channels. The RB refers to a service that is provided by the second layer in order to deliver (or transport) data between the user equipment and the network. In order to do so, the RRC layers of the user equipment and the network exchanges RRC messages to and from one another.

Hereinafter, an RRC state of the user equipment and the RRC connection method will be described. The RRC state refers to whether or not the RRC of a user equipment and the RRC of an E-UTRAN are connected to one another via logical connection. And, if the logical connection is established, the RRC state is referred to as an RRC connected state (RRC_CONNECTED), and if the logical connection is not established, the RRC state is referred to as an RRC idle state (RRC_IDLE).

Since the E-UTRAN can determine the presence of a user equipment being in the RRC_CONNECTED state in cell units, the E-UTRAN may effectively control the user equipment. Conversely, the E-UTRAN cannot determine the presence of a user equipment being in the RRC_IDLE state in cell units, and instead the user equipment being in the RRC_IDLE state is managed by a CN in TA units, the TA unit corresponding to an area unit larger than the cell unit. More specifically, in order to allow a user equipment being in the RRC_IDLE state to receive an audio service or a data service from a cell, the corresponding user equipment should be shifted to the RRC_CONNECTED state.

Most particularly, when the user has first turned on the power of the user equipment, the user equipment first searches for an adequate cell and remains in the RRC_IDLE state in the corresponding cell. The user equipment remaining in the RRC_IDLE state may perform an RRC connection establishment procedure with the RRC of the E-UTRAN only when the user equipment is required to establish RRC connection, thereby being shifted to the RRC_CONNECTED state. Herein, a case when the user equipment is required to establish RRC connection refers to a case when uplink data transmission is required due to reasons, such as a user's attempt to make (or establish) a call, or when the user equipment is required to transmit a response message respective to a paging message transmitted from the E-UTRAN.

An NAS (Non-Access Stratum) layer, which is located above the RRC layer performs the roles of Session Management and Mobility Management. In order to perform mobility management in the NAS layer, the following two states, an EMM (EPS Mobility Management) registered state (EMM-REGISTERED) and an EMM unregistered (or non-registered) state (EMM-UNREGISTERED), are defined, and such two states are applied to the user equipment and the MME. The initial user equipment is in the EMM-UNREGISTERED state, and in order to allow this user equipment to access a network, the initial user equipment should perform a process of being registered to the corresponding network through an Initial Attach procedure. Once the initial attach procedure is successfully performed, the user equipment and the MME are shifted to the EMM-REGISTERED state.

Additionally, in the NAS layer, in order to manage a signaling connection between the user equipment and the EPC, the following two different states, an ECM (EPS Connection Management) idle state (ECM_IDLE) and an ECM (EPS Connection Management) connected state (ECM_CONNECTED), are defined, and such two states are applied to the user equipment and the MME. When the ECM_IDLE user equipment establishes an RRC connection with the E-UTRAN, the corresponding user equipment is shifted to the ECM_CONNECTED state. And, when the ECM_IDLE MME establishes an S1 connection with the E-UTRAN, the corresponding MME is shifted to the ECM_CONNECTED state.

When the user equipment is in the ECM_IDLE state, the E-UTRAN does not carry information (context) of the user equipment. Accordingly, the ECM_IDLE user equipment performs a user equipment based mobility-related procedure, such as a cell selection or cell re-selection procedure, without being required to receive a command from the network. Conversely, when the user equipment is in the ECM_CONNECTED state, the mobility management of the user equipment is management by a command from the network. In the ECM_IDLE state, when the position of the user equipment becomes different from the position known by the network, the user equipment notifies the corresponding position to the network by performing a TA update (Tracking Area Update) procedure.

In the LTE system, one cell that configures a base station (eNB) is set to one of bandwidths of 1.25, 2.5, 5, 10, and 20 Mhz, thereby providing a downlink or uplink transport service to several user equipments. Different cells may be set to provide different bandwidths.

In the network, downlink transmission channels that transmit data to the UE include a BCH (Broadcast Channel), which transmits system information, a PCH (Paging Channel), which transmits paging messages, and a downlink SCH (Shared Channel), which transmits information other than the system information, such as user traffic or control messages. In case of traffic information or control messages of a downlink multicast or broadcast service, the corresponding data may be transmitted through a downlink SCH or may also be transmitted through a separate downlink MCH (Multicast Channel).

Meanwhile, uplink transmission channels that transmit data from the UE to the network include a RACH (Random Access Channel), which transmits initial control messages, and an uplink SCH (Shared Channel), which transmits information other than the system information, such as user traffic or control messages. Logical Channels being in a level higher than the transmission channel and being mapped to the transmission channel include a BCCH (Broadcast Channel), a PCCH (Paging Control Channel), a CCCH (Common Control Channel), an MCCH (Multicast Control Channel), an MTCH (Multicast Traffic Channel), and so on.

Figure 4:
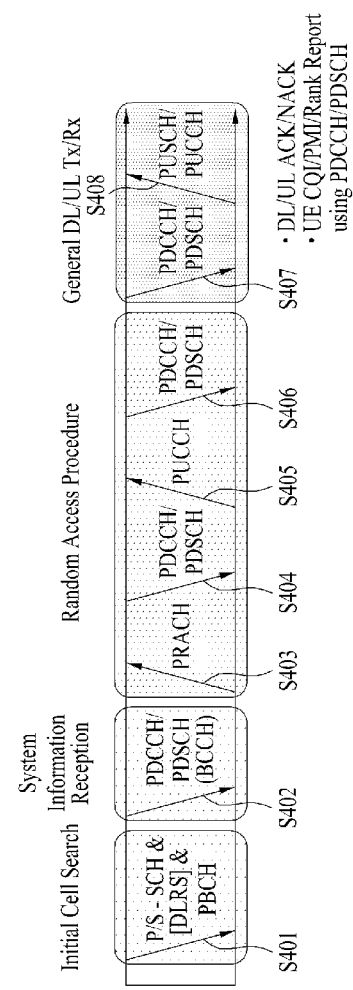
FIG. 4 illustrates physical channels that are used in the 3GPP system and a general method for transmitting signals using such physical channels.

FIG. 4 illustrates physical channels that are used in the 3GPP system and a general method for transmitting signals using such physical channels.

The user equipment performs initial cell search such as synchronization with the base station, when it newly enters a cell or when the power is turned on (S401). In order to do so, the user equipment synchronizes with the base station by receiving a Primary Synchronization Channel (P-SCH) and a Secondary Synchronization Channel (S-SCH) from the base station, and then acquires information such as cell ID, and so on. Thereafter, the user equipment may acquire broadcast information within the cell by receiving a Physical Broadcast Channel from the base station. Meanwhile, in the step of initial cell search, the user equipment may receive a Downlink Reference Signal (DL RS) so as to verify the downlink channel status.

Once the user equipment has completed the initial cell search, the corresponding user equipment may acquire more detailed system information by receiving a Physical Downlink Control Channel (PDCCH) and a Physical Downlink Control Channel (PDSCH) based upon the respective information carried in the PDCCH (S402).

Meanwhile, if the user equipment initially accesses the base station, or if there are no radio resources for signal transmission, the user equipment may perform a Random Access Procedure (RACH) with respect to the base station (S403 to S406). In order to do so, the user equipment may transmit a specific sequence to a preamble through a Physical Random Access Channel (PRACH) (S403), and may receive a response message respective to the preamble through the PDCCH and the PDSCH corresponding to the PDCCH (S404). In case of a contention based RACH, a Contention Resolution Procedure may be additionally performed.

After performing the above-described process steps, the user equipment may perform PDCCH/PDSCH reception (S407) and Physical Uplink Shared Channel (PUSCH)/Physical Uplink Control Channel (PUCCH) transmission (S408), as general uplink/downlink signal transmission procedures. Most particularly, the user equipment receives a Downlink Control Information (DCI) through the PDCCH. Herein, the DCI includes control information, such as resource allocation information respective to the user equipment. And, the format of the DCI may differ from one another depending upon its usage purpose.

Meanwhile, the control information, which is transmitted by the user equipment to the base station or received by the user equipment from the base station via uplink, includes downlink/uplink ACK/NACK signals, a CQI (Channel Quality Indicator), a PMI (Precoding Matrix Index), an RI (Rank Indicator), and so on. In case of the 3GPP LTE system, the user equipment may transmit control information, such as the above-described CQI/PMI/RI through the PUSCH and/or the PUCCH.

Figure 5:
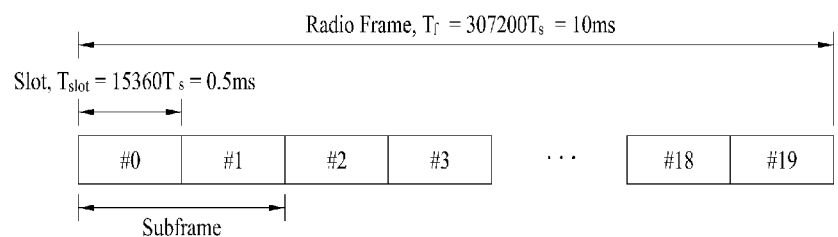
FIG. 5 illustrates an exemplary structure of a radio frame that is used in the LTE system.

FIG. 5 illustrates an exemplary structure of a radio frame that is used in the LTE system.

Referring to FIG. 5, a radio frame has the length of 10 ms ($327200 \times T_S$) and is configured of 10 subframes each having the same size. Each subframe has the length of 1 ms and is configured of 2 slots. Each slot has the length of 0.5 ms ($15360 \times T_S$). Herein, $T_S$ represents a sampling time and is indicated as $T_S=1/(15\ kHz \times 2048)=3.2552 \times 10^{-8}$ (approximately 33 ns). A slot includes a plurality of OFDM symbols in the time domain and includes a plurality of Resource Blocks (RBs) in the frequency domain. In the LTE system, one resource block includes 12 subcarriers×7(6) OFDM symbols. A TTI (Transmission Time Interval), which corresponds to a unit time during which data are transmitted, may be decided as one or more subframe units. Herein, the above-described radio frame structure is merely exemplary. And, therefore, the number of subframes included in a radio frame, or the number of slots included in a subframe, or the number of OFDM symbols included in a slot may be diversely varied.

Figure 6:
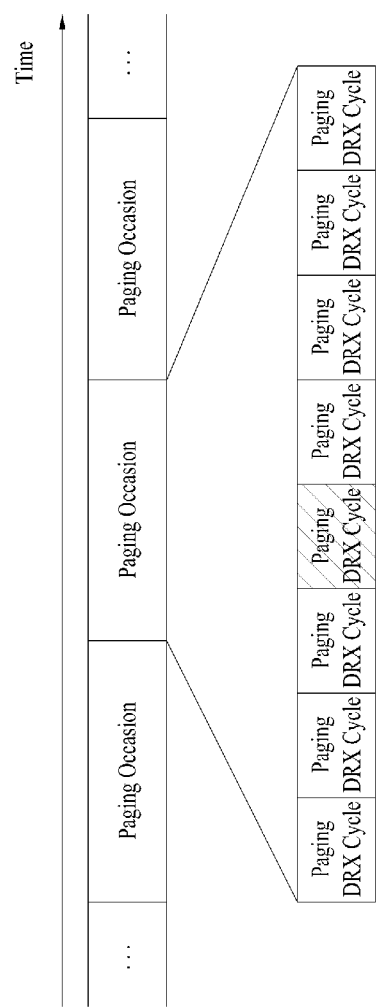
FIG. 6 illustrates a general transmitting/receiving method using a paging message.

FIG. 6 illustrates a general transmitting/receiving method using a paging message.

Referring to FIG. 6, a paging message includes a Paging Cause and a Paging record, which is configured of a user equipment identity (UE Identity), and so on. When receiving the Paging message, the user equipment may perform Discontinuous Reception (DRX) for the purpose of reducing power consumption.

More specifically, the network configures multiple Paging Occasions (POs) at each time cycle, which is referred to as a Paging DRX Cycle. And, a specific user equipment may only receive a specific paging occasion, so as to acquire a paging message. At a time other than the specific paging occasion, the user equipment does not receive any paging channel and may remain in an idle state in order to reduce power consumption. One paging occasion correspond to one TTI.

The base station and the user equipment use a Paging Indicator (PI) as a specific value for notifying the transmission of a paging message. The base station defines a specific identifier (e.g., Paging-Radio Network Temporary Identity; P-RNTI) for the purpose of the PI, thereby being capable of notifying the transmission of the paging information to the user equipment. For example, the user equipment may wake up at least DRX cycle and may receive a subframe in order to notify whether or not a paging message has appeared. Then, when a P-RNTI exists in an L1/L2 control channel (PDCCH) of the received subframe, the user equipment may determine that a paging message exists in the PDSCH of the corresponding subframe. Additionally, when a UE Identifier (e.g., IMSI) of the user equipment itself exists in the paging message, the user equipment may then respond (e.g., perform RRC connection or receive system information) to the base station, so as to receive service.

Hereinafter, System Information will be described in detail. The system information includes required information that should be known by the user equipment in order to access the base station. Therefore, the user equipment is required to receive all system information prior to accessing the base station. And, additionally, the user equipment is required to be always provided with the latest (or most recent) system information. Moreover, since the system information corresponds to information that should be known by all user equipments included in a single cell, the base station periodically transmits the system information.

The system information may be divided into MIB (Master Information Block), SB (Scheduling Block), and SIB (System Information Block). The MIB allows the user equipment to be aware of a physical structure, e.g., bandwidth, of the corresponding cell. The SB notifies transmission information, e.g., transmission cycle, of the SIBs. And, the SIB corresponds to a collection of system information being correlated with one another. For example, a specific SIB includes only information on neighboring cells, and another SIB includes information on an uplink radio channel used by the user equipment.

In order to notify the user equipment of any change in the system information, the base station transmits a paging message. In this case, the paging message includes a system information change indicator. Depending upon the paging DRX cycle, the user equipment receives a paging message, and, in case the received paging message includes the system information change indicator, the user equipment receives system information being transmitted through a BCCH.

Hereinafter, an MTC (Machine type communication) will be described in detail.

An MTC refers to a type of communication that is established between one machine and another machine without any human interference, and a device that is used for MTC is referred to as an MTC device. The MTC is also referred to as M2M (Machine to Machine). A service that is being provided via MTC is distinguished from a conventional service that is performed via communication established by human interference, and, accordingly, a wide range of services exists as described below. For example, services such as Tracking, Metering, Payment, Medical services, remote controlled services, and so on, are provided via MTC.

Figure 7:
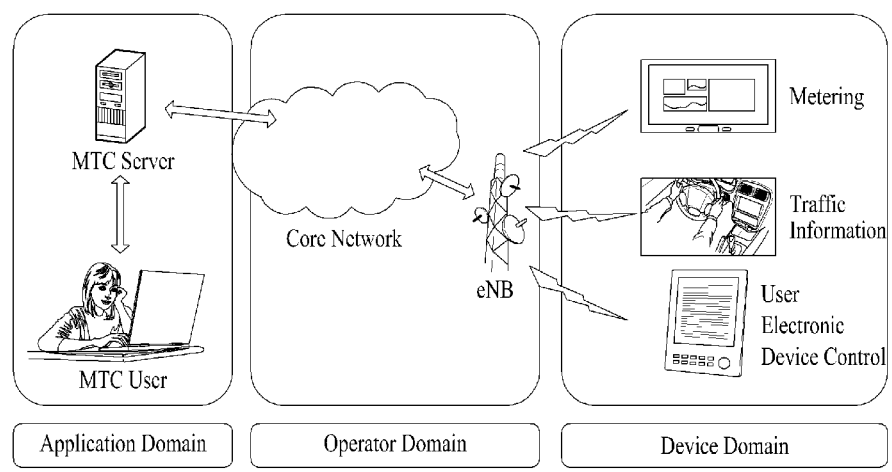
FIG. 7 illustrates a structure of MTC (Machine type communication).

FIG. 7 illustrates a structure of MTC (Machine type communication).

The MTC device communicates with another MTC device or MTC server through a mobile communication network. The MTC server may provide diverse services, such as metering, traffic information (or road information), user electronic device control, and so on, which are provided through MTC devices, as shown in FIG. 7, to an MTC User.

In order to effectively support the MTC service, diverse characteristics of an MTC device, such as low mobility, Time tolerant (or tolerance) or Delay tolerant (or tolerance), Delay tolerance, Small data transmission, and so on, may be taken into consideration. And, for such reasons, the MTC device may also be referred to as Delay tolerant access supported user equipment.

Additionally, it may be assumed that a large number of MTC devices can exist in a single cell. Therefore, when simultaneously providing a communication service to the large number of MTC devices, all of the MTC devices are required to establish RRC connection with the network. According to the related art method, since a large number of devices establish RRC connection with the network at the same time, an overload occurs in the network, thereby causing a problem in not being capable of providing proper service to the MTC devices. In order to resolve such problem, when an overload occurs in the network, the network may be required to reject (or disapprove) the RRC connection with the corresponding MTC device. However, there lies a problem in the related art method in that the network is incapable of determining whether or not the user equipment corresponds to an MTC device.

Therefore, according to the present invention, a lower layer, i.e., RRC layer, of the user equipment receives a Low priority access indicator from a higher layer, i.e., NAS layer, of the user equipment, and the RRC layer includes the low priority access indicator to an Establishment Cause information, and, in case the lower layer of the user equipment transmits an RRC connection request message requesting access to the network, the RRC layer transmits the establishment cause information including the low priority access indicator to the network through the RRC connection request message. The user equipment that has transmitted the RRC connection request message receives an RRC connection establishment message from the network and transmits an RRC connection establishment complete message, thereby completing access to the network. The low priority access indicator included in the establishment cause information may signify a "Delay Tolerant Access", which corresponds to a characteristic of the MTC device.

Additionally, according to the present invention, a general user equipment transmits an RRC connection request message for performing access to the network, receives an RRC connection establishment message from the network, and transmits an RRC connection establishment complete message, which includes an indicator indicating non-low priority access, i.e., a general indicator, thereby completing access to the network.

More specifically, according to the present invention, when a user equipment supporting MTC accesses a network, it may be determined whether or not the access type corresponds to a low priority access or a general (or non-low priority) access, and, then, in case of the low priority access, a low priority access indicator may be included in the RRC connection request message, and, in case of the non-low priority access, i.e., in case of the general access, an indicator indicating non-low priority access may be included in the RRC connection establishment complete message.

Hereinafter, detailed examples will be described with reference to the drawings.

Figure 8:
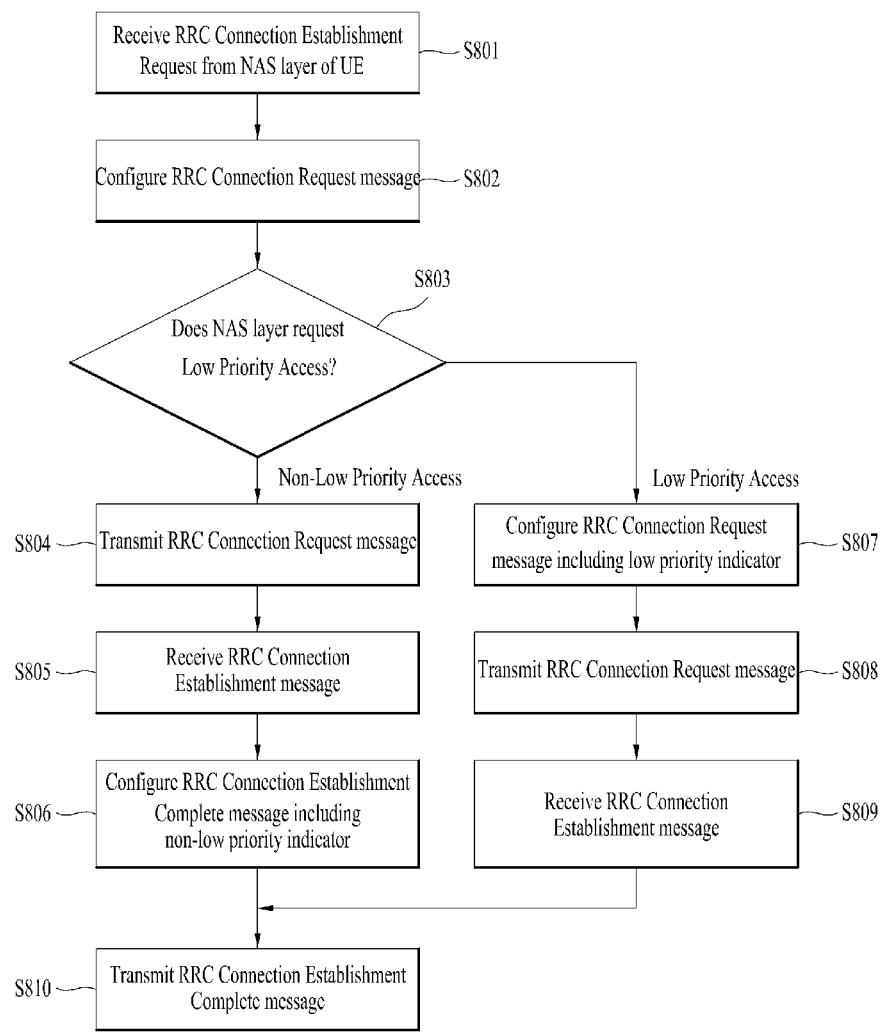
FIG. 8 illustrates a flow chart showing the process steps of an RRC connection procedure of an MTC device according to an exemplary embodiment of the present invention.

FIG. 8 illustrates a flow chart showing the process steps of an RRC connection procedure of an MTC device according to an exemplary embodiment of the present invention. Most particularly, referring to FIG. 8, as described above, the low-priority access signifies "Delay Tolerant Access", which corresponds to a characteristic of the MTC device.

Referring to FIG. 8, when an RRC Idle Mode user equipment receives an RRC connection establishment request from a NAS layer (i.e., a higher layer of the RRC layer) of the user equipment, as shown in step 801, the RRC connection establishment procedure for performing access to the network begins (or starts).

In this case, when the user equipment supports MTC, i.e., when the user equipment supports delay tolerant access, the NAS layer of the user equipment notifies the RRC layer of the priority level to which the access to the network corresponds. For example, the NAS layer of the user equipment may notify whether the priority level of the access corresponds to a low-priority MTC access or a non-low priority MTC access. Additionally, the NAS layer of the user equipment may notify information on an Establishment Cause of the RRC connection to the RRC layer.

Subsequently, in step 802, the RRC layer of the user equipment configures an RRC connection request message based upon the information delivered from the NAS layer of the user equipment. In this case, in step 803, the RRC layer of the user equipment verifies the priority level request for access to the network, which is indicated by the NAS layer of the user equipment If the required network access corresponds to a general MTC access instead of a low-priority MTC access, the RRC layer of the user equipment transmits an RRC connection request message to the base station via uplink transmission, as shown in step 804. Herein, another establishment cause other than the low-priority access, i.e., delay tolerant access, may be selected as the establishment cause being included in the RRC connection request message. And, the other establishment cause may correspond to any one of the causes shown in Table 1 below.

TABLE 1

| 1 | Emergency |
| 2 | highPriorityAccess |
| 3 | mt-Access (mobile terminating access) |
| 4 | mo-Signalling (mobile originating signaling) |
| 5 | mo-Data (mobile originating data) |

In step 805, as a response to the RRC connection request message, the user equipment receives an RRC connection establishment message, which is transmitted from the base station. In order to do so, as shown in step 806, the user equipment includes an indicator indicating a general MTC access in the RRC connection establishment complete message in the RRC connection establishment complete message.

Meanwhile, in step 803, when it is verified that the network access corresponds to a low-priority MTC access, in step 807, an RRC connection request message including a low-priority access indicator is configured. More specifically, the user equipment selects a low-priority access, i.e., a delay tolerant access, as the establishment cause, which is included in the RRC connection request message. Thereafter, the user equipment transmits an RRC connection request message to the base station, in step 808, and, as a response to the RRC connection request message, the user equipment receives an RRC connection establishment message respective to the RRC connection request message from the base station in step 809.

Finally, in step 810, the user equipment transmits an RRC connection establishment complete message to the base station. If the network access corresponds to a general MTC access instead of the low-priority MTC access, the user equipment may include an indicator signifying that the access corresponds to the general MTC access in the RRC connection establishment complete message. However, when the network access corresponds to the low-priority MTC access, the user equipment does not include any MTC access indicator to the RRC connection establishment complete message.

Meanwhile, the user equipment may also include UE capability information for the MTC to the RRC connection establishment complete message.

When the RRC connection procedure is successfully completed, the user equipment shifts to the RRC Connected Mode. Thereafter, when an overload occurs due to the MTC devices, the base station transmits an RRC disconnection message (or RRC connection cancel message) to the user equipment, thereby being capable of cancelling (or disconnecting) the corresponding RRC connection. At this point, the base station may select 'MTC overload' as the cancellation (or disconnection) cause, which is included in the RRC disconnection message (or RRC connection cancel message), and, then, the base station may transmit the RRC disconnection message (or RRC connection cancel message) to the corresponding user equipment.

In case of a roaming user equipment that does not access a cell of an HPLMN (Home Public Land Mobile Network), the user equipment may include an 'indicator notifying that the user equipment corresponds to an MTC roaming user equipment' to the RRC connection request message or the RRC connection establishment complete message. In case the base station receives such indicator notifying that the user equipment corresponds to an MTC roaming user equipment, the base station may selectively reject RRC connection or cancel connection (or disconnect) of only the MTC roaming user equipments.

Figure 9:
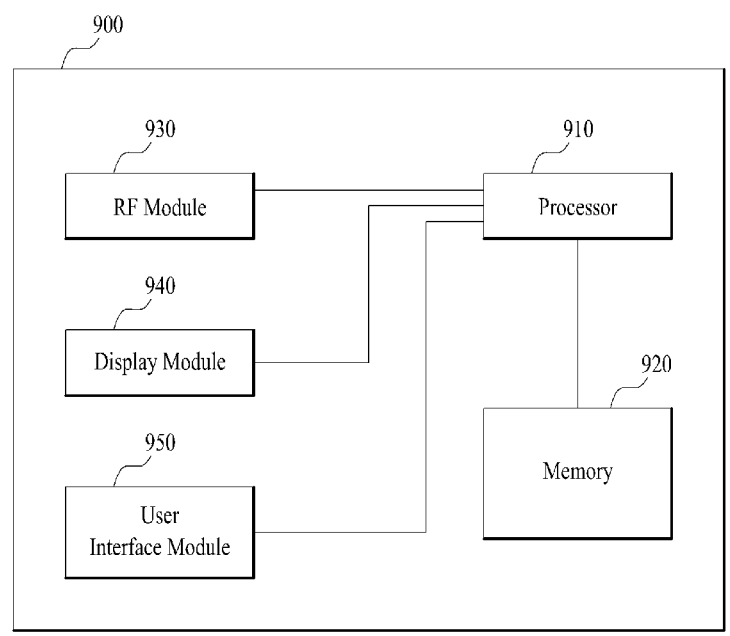
FIG. 9 illustrates a block view showing the structures of a communication device according to an exemplary embodiment of the present invention.

FIG. 9 illustrates a block view showing the structures of a communication device according to an exemplary embodiment of the present invention.

Referring to FIG. 9, a communication device (900) includes a processor (910), a memory (920), an RF module (930), a display module (940), and a user interface module (950).

The communication device (900) is an exemplary illustration provided to simplify the description of the present invention. Also, the communication device (900) may further include necessary modules. Also, in the communication device (900) some of the modules may be divided into more segmented modules. Referring to FIG. 9, an example of the processor (910) is configured to perform operations according to the embodiment of the present invention. More specifically, reference may be made to FIG. 1 to FIG. 8 for the detailed operations of the processor (910).

The memory (920) is connected to the processor (910) and stores operating systems, applications, program codes, data, and so on. The RF module (930) is connected to the processor (910) and performs a function of converting baseband signals to radio (or wireless) signals or converting radio signals to baseband signals. In order to do so, the RF module (930) performs analog conversion, amplification, filtering, and frequency uplink conversion or inverse processes of the same. The display module (940) is connected to the processor (910) and displays diverse information. The display module (940) will not be limited only to the example given herein. In other words, generally known elements, such as LCD (Liquid Crystal Display), LED (Light Emitting Diode), OLED (Organic Light Emitting Diode) may also be used as the display module (940). The user interface module (950) is connected to the processor (910), and the user interface module (950) may be configured of a combination of generally known user interfaces, such as keypads, touchscreens, and so on.

The above-described embodiments of the present invention correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention. Furthermore, it is apparent that claims that do not have any explicit citations within the scope of the claims of the present invention may either be combined to configure another embodiment of the present invention, or new claims may be added during the amendment of the present invention after the filing for the patent application of the present invention.

In the description of the present invention, the embodiments of the present invention have been described by mainly focusing on the data transmission and reception relation between the relay node and the base station. Occasionally, in the description of the present invention, particular operations of the present invention that are described as being performed by the base station may also be performed by an upper node of the base station. More specifically, in a network consisting of multiple network nodes including the base station, it is apparent that diverse operations that are performed in order to communicate with the terminal may be performed by the base station or b network nodes other than the base station. Herein, the term Base Station (BS) may be replaced by other terms, such as fixed station, Node B, eNode B (eNB), Access Point (AP), and so on.

The above-described embodiments of the present invention may be implemented by using a variety of methods. For example, the embodiments of the present invention may be implemented in the form of hardware, firmware, or software, or in a combination of hardware, firmware, and/or software. In case of implementing the embodiments of the present invention in the form of hardware, the method according to the embodiments of the present invention may be implemented by using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory unit may be located inside or outside of the processor, and the memory unit may transmit and receive data to and from the processor by using a wide range of methods that have already been disclosed.

The present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents.

INDUSTRIAL APPLICABILITY

As described above, although the RRC (Radio Resource Control) method and device therefor of a user equipment supporting delay tolerant user equipment in a wireless communication system is described based upon an example being applied to the 3GPP LTE system, the present invention may also be applied to other variety of wireless communication systems apart from the 3GPP LTE system.

What is claimed is:

1. A method of a user equipment for performing a connection procedure with a network in a wireless communication system, the method comprising:
   transmitting to the network a radio resource control (RRC) connection request message for being connected with the network;
   receiving an RRC connection establishment message, as a response to the RRC connection request message, from the network; and
   transmitting an RRC connection establishment complete message to the network,
   wherein the user equipment corresponds to a machine type communication (MTC) device,
   wherein the RRC connection establishment complete message includes a general MTC access indicator indicating that an access to the network corresponds to a non-low priority MTC access when an establishment cause of the RRC connection request message is not a low priority MTC access, and
   wherein the RRC connection establishment complete message does not include the general MTC access indicator when the establishment cause of the RRC connection request message is the low priority MTC access.

2. The method of claim 1, wherein the low priority MTC access indicates a Delay Tolerant Access to the network.

3. The method of claim 1, further comprising:
   receiving information on a priority level of a connection to the network from a higher layer.

4. The method of claim 3, wherein the higher layer corresponds to a NAS (Non-Access Stratum) layer.

5. The method of claim 3, wherein the information on a priority level of a connection to the network includes information on an Establishment Cause of the connection request message.

6. The method of claim 1, wherein the RRC connection establishment complete message includes capability information of the user equipment.

7. The method of claim 1, further comprising:
   receiving a connection cancel message including a delay tolerant access overload indicator from the network.

8. The method of claim 1, wherein, when the user equipment does not access an HPLMN (Home Public Land Mobile Network), the RRC connection request message or the RRC connection establishment complete message includes a roaming user equipment indicator.

9. A method of a network for performing a connection procedure with a user equipment in a wireless communication system, the method comprising:
   receiving a radio resource control (RRC) connection request message for being connected with the network from the user equipment;
   transmitting an RRC connection establishment message, as a response to the RRC connection request message, to the user equipment; and
   receiving an RRC connection establishment complete message from the user equipment,
   wherein the user equipment corresponds to a machine type communication (MTC) device,
   wherein the RRC connection establishment complete message includes a general MTC access indicator indicating that an access to the network corresponds to a non-low priority MTC access when an establishment cause of the RRC connection request message is not a low priority MTC access, and
   wherein the RRC connection establishment complete message does not include the general MTC access indicator when the establishment cause of the RRC connection request message is the low priority MTC access.

10. The method of claim 9, wherein the low priority MTC access indicates a Delay Tolerant Access to the network.

11. The method of claim 9, wherein the RRC connection establishment complete message includes capability information of the user equipment.

12. The method of claim 9, further comprising:
    transmitting a connection cancel message including a delay tolerant access overload indicator to the user equipment.

13. The method of claim 9, wherein, when the user equipment does not access an HPLMN (Home Public Land Mobile Network), the RRC connection request message or the RRC connection establishment complete message includes a roaming user equipment indicator.

* * * * *